Dec. 27, 1932.    W. M. BAILEY    1,892,375
ELECTRICAL DEVICE AND METHOD OF FORMING INSULATING DIELECTRICS THEREIN
Filed Dec. 2, 1929    2 Sheets-Sheet 1
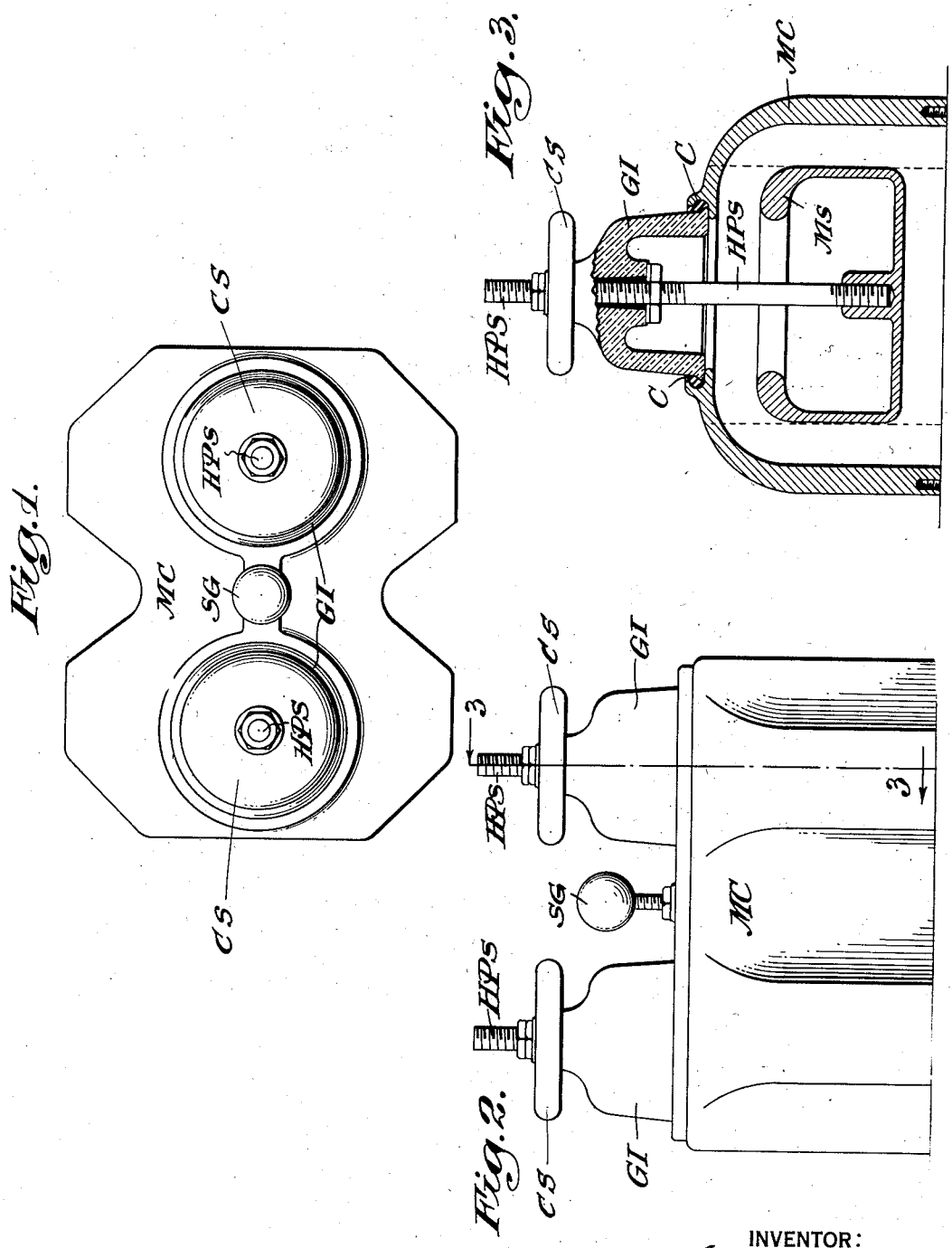
INVENTOR:
William M. Bailey
BY
his ATTORNEY.

Dec. 27, 1932.   W. M. BAILEY   1,892,375
ELECTRICAL DEVICE AND METHOD OF FORMING INSULATING DIELECTRICS THEREIN
Filed Dec. 2, 1929   2 Sheets-Sheet 2
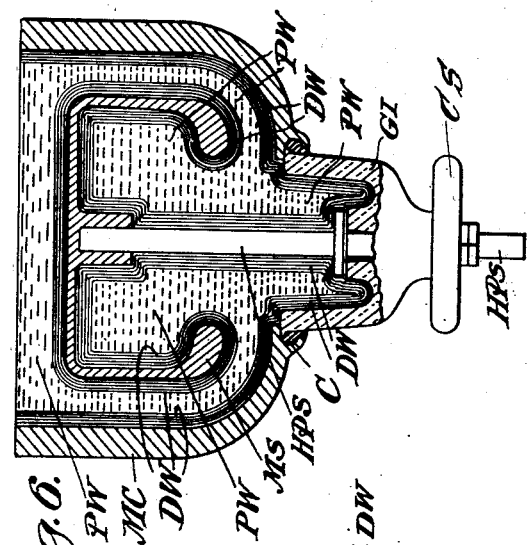
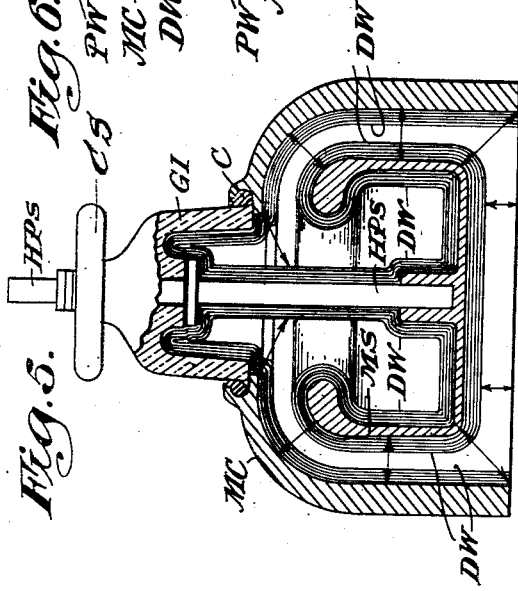
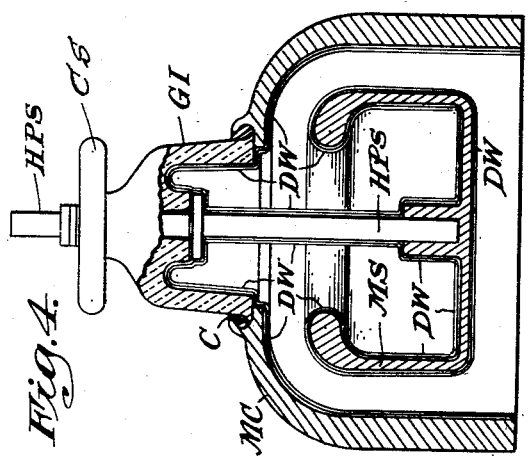
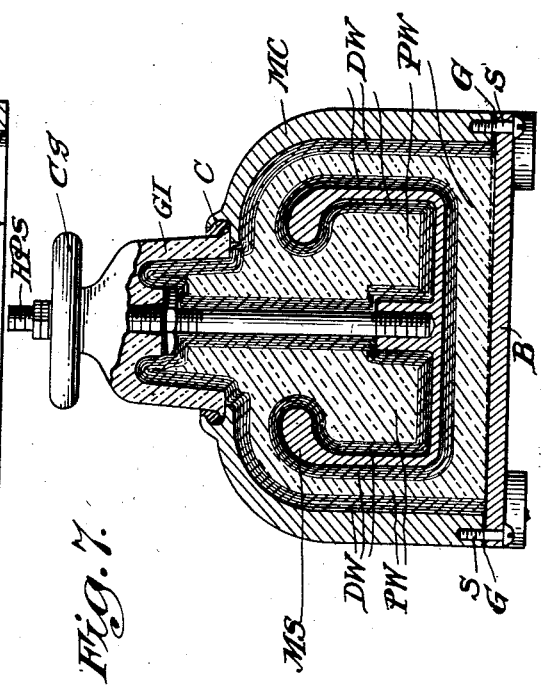
INVENTOR:
William M. Bailey
BY
his ATTORNEY.

Patented Dec. 27, 1932

1,892,375

UNITED STATES PATENT OFFICE

WILLIAM MASON BAILEY, OF LYNN, MASSACHUSETTS, ASSIGNOR, BY MESNE ASSIGNMENTS, TO GENERAL ELECTRIC COMPANY, A CORPORATION OF NEW YORK

ELECTRICAL DEVICE AND METHOD OF FORMING INSULATING DIELECTRICS THEREIN

Application filed December 2, 1929. Serial No. 411,014.

This invention relates to electrical devices and more particularly to an improved method of forming an insulating dielectric in capacitors subjected to high voltages, and to the improved capacitor obtained by the use of the novel process.

Hitherto, in the use of capacitors of low capacity, of the order of 20 micro-micro-farads, operated at potential differences of the order of 50,000 volts to handle a current of 1 ampere, at a wavelength of 1,000 meters, it has been customary to provide solid insulating embedment between the electrodes. Capacitors intended for such uses comprise large metal casings, of the general type set forth in the patent of W. H. Priess, No. 1,558,043, of October 20, 1925, the metallic casing being adapted to serve as an armature, together with an inner armature secured to, and insulated from the casing by a suitable insulating bushing. The insulating material which is cast in place inside the casing and consequently around the encased armature, serves as the dielectric of the capacitor between the two armatures. The masses or mass of such dielectric are subject to stresses during solidification of the casting, due to the normal shrinkage of the commercially available embedding materials, which shrinkage results in the formation of cracks and voids or vacuoles, through the mass of the embedment, in directions from one armature to the other, such cracks permitting the entrance of air and/or moisture, which materials, together with the vacuoles or lacunæ, decrease the breakdown strength of the unit and render the capacitor inferior or unfit for service.

These prior art difficulties have been overcome by the present invention, in which the armatures, i. e., the metallic casing as the enclosing armature and the inner or enclosed armature or armatures are provided with laminæ of dielectric material, such as sulphur or any of the well known wax materials such as Halowax, or paraffin wax. The structure including the assembly of the enclosed and enclosing armatures and the means holding them together, first are provided with a thin coating of the molten dielectric material and then drained and cooled to permit the formation of a relatively thin layer of the dielectric in solid form to the facing interior surfaces of the armature elements, said operations are repeated a sufficient number of times to provide a wall of material of interfused thin laminæ having a total thickness of approximately ⅜ of an inch, altho any desired thickness may be secured. The sum total of the layers of material deposited on the elements of the capacitor should be sufficient to take up from 75% to 50% of the enclosed interarmature space, altho as much of the interarmature space should be so filled as is economically possible.

Due to the resulting thick walls of dielectric material on the respective facing surfaces of the two armatures, each wall consisting of a substantial member of laminæ, the formation of vacuoles, voids, or other lacunæ, normally occurring when substantial bodies or masses of molten material are chilled or frozen from the exterior inwardly, is substantially precluded because the relatively thin layers of laminæ do not provide sufficient bulk of material to permit this to occur to any appreciable extent. In addition, the interfused surface portions of the successive laminæ provide a structurally strong material well adapted to support the normal physical stresses to which the capacitors are subject in use.

The successively formed thin layers or strata, in addition to being free from lacunæ, provide a plurality of barriers to the formation of extensive cracks in the interarmature embedment, due to the fact that a crack forming in the relatively thin layers, due to voids, cracks and strains, is propagated only in the principal layer in which it is formed, which layer is provided with a protective coating or coatings of other similarly formed layers. The groups of thin laminæ on the interior facing walls of the enclosed and enclosing armatures, all extend across the intense electrostatic field between the two armatures. As the electric stresses or current paths between the enclosed and enclosing armatures are directed directly from the surface of one armature to the surface of another, the thin dielectric layers which are coextensive with the active armature surfaces are transversely positioned with respect to the current paths. As above noted, relatively few or no vacuoles, voids, or other lacunæ are formed, as the thin layers do not present enough bulk to make shrinkage effects noticeable, whereas the number of the thin layers in each group is sufficient to constitute a strong, massive structure. When the desired number of layers have been formed on the facing interior armature surfaces to give the desired thickness therebetween, the remaining interarmature space or spaces may be filled with a similar embedment in the usual manner, i. e., as by ordinary pouring or casting, as will be described more in detail hereinafter. By this improved process any lacunæ formed in the laminæ are oriented normally to, i. e., transversely of, the electric field, for the reason that the dielectric structure has a cleavage which is normal to the current paths, which construction precludes the formation of voids or cracks directed parallel to, or along the electric lines from one armature to the other which would furnish direct paths for breakdown from armature to armature.

Any shinkage cracks in a direction from one another to the other and which might start in any given thin dielectric layer, are restricted to that layer by being stopped by the adjacent layers, that is, it cannot extend entirely through the two groups of layers or from armature to armature.

Further unexpected results are noted in the use of the novel process of the present invention. As is well known, certain of the more highly desirable substances adapted for use in electrical construction, e. g.: sulphur, and Halowax, are characterized by the tendency to form coarsely crystalline structures when slowly cooled in thick layers. Such coarse crystallization leads to the formation of deleterious shrinkage cracks which usually run with the electric field, due to the tendency of the crystals to build out normally from the chilled armature surfaces.

In addition, the cryptocrystalline, or microscopically fine, condition of the materials forming the layers, resulting from the above described treatment, insures the presence of a uniform crystalline mass having substantially no intercrystalline spaces sufficiently large to impair the dielectric strength of the mass.

Where a single capacitor armature or other electrical device is centrally disposed within a casing, as shown, the thin layers can be formed by spinning the device on its longitudinal axis and utilizing the centripetal force of the quanta of added fused dielectric material to project it in successive even thin layers on the several parts in the casing.

While a holosteric embedment may be formed according to prior art processes, such constructions require an extremely high degree of care in manufacture, and the resulting time and cost of labor increase the overall cost of the structures to an uneconomically high point. By the practice of the present invention, substantial holostericity of embedment is secured with the result that the embedment has substantially double the electrical strength of a well formed embedment of the same material made with the high degree of care required to avoid the formation of voids, shrink holes, and transverse fissures. As compared with the prior art constructions made in the ordinary manner and which have a number of voids in the embedment, the electrical strength of the embedment of the present invention is substantially quadrupled.

In the accompanying drawings there has been shown a preferred embodiment of the principles of the invention, but it is to be particularly understood that this construction is presented by way of example only, for, since the underlying principles may be applied to other electrical constructions, it is not intended to be limited to the one herein shown, unless such limitations are clearly imposed by the appended claims.

In the drawings like characters refer to similar parts throughout the several views of which:

Fig. 1 is a top plan view of a two terminal capacitor having a metal casing serving as a common armature;

Fig. 2 is a side elevation of same;

Fig. 3 is a transverse cross section taken on line 3—3 of Fig. 2, and looking in the direction of the arrows;

Figs. 4, 5 and 6 are outline cross sections, partly in elevation, similar to the showing of Fig. 3, showing successive operations of dipping, the structure in Fig. 6 being inverted to receive a charge of fluid dielectric shown in hot or liquid form, and Fig. 7 is a transverse section of a finished capacitor with the bottom in place and the poured embedment indicated as solidified.

The capacitor structure shown by way of exemplification, comprises generally, a bipartite metal casing MC of the type shown in the patent to W. H. Priess, 1,499,403 of July 1, 1924, and having shouldered portions 10, converging inwardly to form apertures 11, adapted to receive insulating bushings of glass, porcelain or other suitable structural insulating material, and which are designated generally by the character Gl; the second metallic part of the casing being the separate bottom B, Fig. 7, which is applied as the last step in manufacture. The members Gl are secured in annular channels 12 of members 10 by means of a suitable cement C. High potential studs or terminals HPS are secured to the insulating bushing in any suitable manner and are provided with corona shields CS on the outside of the structure. A spark gap electrode SG may be suitably mounted on the casing between the corona shields. Interiorly of the casing, the high potential studs HPS are secured to encased condenser-members MS,- one of which is shown with an exterior surface configured to approximate the interior surface of the metallic casing MC which constitutes the low potential terminal of the condenser. The member MS is unitary hollow metallic armature which is generally hollowed out, for the purpose of reducing the amount of metal required in its construction, as the interior portion is wasted metal as far as the electrical efficiency of the construction is concerned, the outer surface being the only active portion in a high potential, high frequency device. The other armature is metallic casing MC which is also one of the terminals of the condenser. The casing MC encloses two duplicate armatures MS and is an armature common to both of them. The two terminals of the two enclosed armatures MS are at HPS, HPS.

The dipped or sprayed wax or sulphur layers associated with the surfaces strata or layers associated with the surfaces of the armatures MC and MS and shown as thin laminæ configured to and coextensive therewith, are designated generally by the character DW, Figs. 5–7, and the mass of wax or sulphur or any other suitable material which is cast in place after the effective transverse layers DW have been formed, is designated generally by the character PW. This embedment PW is cast in the usual way as above, and due to its association with the strata DW preferably of like material associated with the active surfaces of the armatures, a substantially holosteric armature-to-armature dielectric is provided between the two armatures MC and MS.

Fig. 5 shows the structure lacking bottom cover B of Fig. 7, and just before the operations of Figs. 6–7.

Referring now to Fig. 5, showing the product after a plurality of dipping and cooling operations, the current paths between the two armatures are indicated by arrows showing that the layers DW are substantially at right angles to these paths, thus permitting the layers to function in the desired manner and afford the maximum protection and efficiency to the construction.

Each enclosed armature MS is equi-potential with its terminal HPS with the result that the dielectric material disposed in the interior the enclosed armature MS need not be prepared or disposed with any high degree of accuracy or care, as it is not subject to any electrical stresses. If desired, the bottom portion of enclosed armature MS may be provided with suitable apertures to permit the drainage of the sulfur et al. after dipping in order to insure a symmetrical construction, or to permit ingress of atomized molten sulfur into the hollow electrode space.

When the final filling operation is undertaken to cast PW, as indicated in Fig. 6, the embedment PW is poured in in the usual manner as if no laminæ of DW were present, and at a temperature just above the melting point of DW in order to prevent any substantial melting off or alteration in the layers DW, altho permitting the interfusion of the exterior layer or layers with the embedding material PW, which, as indicated above, preferably is of the same composition as that used to form the layers DW, i. e. is at least of a melting point not substantially higher than DW.

When the capacitor unit has been formed in any of the ways above described, any residual embedding material found on the outer surfaces of the casing MC, is removed in the usual manner, and the cover or bottom plate B, Fig. 7 is secured to the casing by any suitable means, such as screws S, a suitable yielding gasket G of lead or other like material, being interposed between the bottom and the casing to permit a tight and uniform fit.

It will now be appreciated that there has been provided a novel method of preventing breakdown in dielectrics and insulating masses between electrically associated conducting elements of high potential capacitors, and more particularly an improved high potential capacitor adapted for use in high frequency circuits, which capacitor of low capacity is endowed with long operative life, due to the fact that its electrical strength is substantially quadruple those of like constructions made according to prior art practices.

What is claimed is:

1. A capacitor comprising an armature member, an internal hollow armature member within the first armature member and supported therefrom, said inner armature member being hollow and provided with a perforation adjacent and substantially alined with a perforation in the outer armature member, and a supporting member for the inner armature member passing thru the perforation of the outer armature member.

2. A capacitor comprising an armature member, an internal hollow armature member within the first armature member and supported therefrom, said inner armature member being hollow and provided with a perforation adjacent and substantially alined with a perforation in the outer armature member, and a supporting member for the inner armature member passing thru the perforations of each armature member.

3. A capacitor comprising an outer hollow armature and an inner hollow armature, a rigid connection from said inner armature passing thru a perforation in the outer armature and insulated therefrom, dielectric material between said armatures, said inner armature being perforate to receive the dielectric material within it, the perforate portion of the inner armature being opposite a perforate portion of the outer armature.

4. A capacitor comprising an outer hollow armature and an inner hollow armature, a rigid connection from said inner armature passing thru a perforation in the outer armature and insulated therefrom, dielectric material between said armatures, said inner armature being perforate to receive the dielectric material within it, the perforate portion of the inner armature being opposite a perforate portion of the outer armature, and the edge around the perforate portion of the inner armature being rounded and thickened with respect to the walls of said inner armature.

5. A low capacity condenser for high potential service which includes two metallic armatures spaced from one another and one of them being a casing enclosing the other, the casing or enclosing armature being formed with opposite openings, the enclosed armature being supported by the enclosing armature or casing, a terminal lead and an insulating bushing in one of said openings in the enclosing armature constituting the means supporting the enclosed armature by the enclosing armature; the space between the two armatures being filled with normally solid dielectric material of low melting point, the second opening of the enclosing armature providing for entrance of said material into the interior space between the armatures, and at least substantially thick portions of said dielectric material along the interior facing surfaces of said armatures each including a group of a substantial number of thin layers which extend at right angles to the paths of the lines of the intense electrostatic field between said interior facing surfaces of the armatures.

6. A low capacity condenser for high potential service which includes three metallic armatures all spaced apart; one of them being a casing enclosing the other two and constituting an armature common to the other two and a terminal, said other two armatures lying side by side inside the enclosing armature or casing, the latter or enclosing armature being formed with two lead-openings; terminal leads from the two enclosed armatures and extending thru said openings, and insulating bushings closing said openings in the casing or enclosing armature and supporting said terminal leads and enclosed armatures; the space between the respective three armatures being filled with a mass of normally solid dielectric material of low melting point, and at least substantially thick portions of said dielectric material along the interior facing surfaces of the enclosing and enclosed armatures each including a group of a substantial number of thin layers which extend at right angles to the paths of the lines of the electrostatic fields between said interior facing surfaces of the enclosing armature and the respective enclosed armatures.

7. A low capacity condenser for high potential service which includes two metallic armatures spaced from one another and one of them being a casing enclosing the other, the casing or enclosing armature being formed with opposite openings, means closing one of said openings and supporting the enclosed armature; and a mass of sulfur filling the space between said armatures and constituting the dielectric between them, at least substantially thick portions of said sulfur mass which extend along the interior facing surfaces of said armatures each including a group of a substantial number of thin layers which extend at right angles to the paths of the lines of the intense electrostatic field between said interior facing surfaces of the armatures.

8. In a condenser including two metallic armatures of which one is a casing enclosing the other, and having its interior wall spaced from the other, the method of providing a dielectric between said armatures inside the casing-armature and consisting of normally solid readily fusible dielectric material, which consists in forming substantially thick coatings of such dielectric material on the interior facing surfaces of said armatures by successively applying thin layers simultaneously to both said facing surfaces, and then filling the space between said two thick groups of thin layers by casting therein a filler of normally solid readily fusible dielectric material, whereby at least two groups of thin layers extend at right angles to the paths of the lines of the intense electrostatic field between said interior facing surfaces of the armatures.

In testimony whereof I hereunto affix my signature.

WILLIAM M. BAILEY.